United States Patent [19]

Gupta et al.

[11] Patent Number: 5,236,745

[45] Date of Patent: Aug. 17, 1993

[54] METHOD FOR INCREASING THE CYCLIC SPALLATION LIFE OF A THERMAL BARRIER COATING

[75] Inventors: Bhupendra K. Gupta; Jim D. Reeves, both of Cincinnati; Bangalore A. Nagaraj, West Chester, all of Ohio

[73] Assignee: General Electric Company, Cincinnati, Ohio

[21] Appl. No.: 759,335

[22] Filed: Sep. 13, 1991

[51] Int. Cl.$^5$ ............................................. B05D 1/02
[52] U.S. Cl. .................................. 427/454; 427/250; 427/252; 427/405; 427/419.2; 427/456; 428/609; 428/621; 428/633; 428/680; 428/937
[58] Field of Search ............. 427/34, 250, 252, 383.7, 427/383.9, 405, 419.2, 423, 454, 455, 456; 428/609, 612, 621, 632, 633, 679, 680, 682, 937, 938, 678

[56] References Cited

U.S. PATENT DOCUMENTS

| | | | |
|---|---|---|---|
| 3,415,631 | 12/1968 | Ault et al. | 29/195 |
| 3,849,865 | 11/1974 | Gedwill et al. | 428/629 |
| 3,874,901 | 4/1975 | Rairden, III | 427/405 |
| 3,957,454 | 5/1976 | Bessen | 428/937 |
| 4,055,706 | 10/1977 | Stecura et al. | 428/633 |
| 4,080,486 | 3/1978 | Walker et al. | 428/678 |
| 4,084,025 | 4/1978 | Rairden, III | 427/383.9 |
| 4,095,003 | 6/1978 | Weatherly et al. | 427/34 |
| 4,123,595 | 10/1978 | Chang | 428/678 |
| 4,246,323 | 1/1981 | Bornstein et al. | 427/405 |
| 4,269,903 | 5/1981 | Clingman et al. | 428/591 |
| 4,303,693 | 12/1981 | Driver | 427/454 |
| 4,313,760 | 2/1982 | Dardi | 106/1.12 |
| 4,321,311 | 3/1982 | Strangman | 428/633 |
| 4,326,011 | 4/1982 | Goebel et al. | 428/680 |
| 4,328,285 | 5/1982 | Siemers et al. | 428/633 |
| 4,401,697 | 8/1983 | Strangman | 427/250 |
| 4,405,284 | 9/1983 | Albrecht et al. | 427/34 |
| 4,405,660 | 9/1983 | Ulion et al. | 427/250 |
| 4,418,124 | 11/1983 | Jackson et al. | 428/548 |
| 4,485,151 | 11/1984 | Stecura | 428/633 |
| 4,576,874 | 3/1986 | Spengler et al. | 427/423 |
| 4,861,618 | 8/1989 | Vine et al. | 427/454 |
| 4,897,315 | 1/1990 | Gupta | 428/680 |
| 4,910,092 | 3/1990 | Olson et al. | 428/678 |
| 4,933,239 | 6/1990 | Olson et al. | 428/678 |
| 5,059,095 | 10/1991 | Kushner et al. | 29/889.23 |

FOREIGN PATENT DOCUMENTS

| | | | |
|---|---|---|---|
| 2025686 | 12/1971 | Fed. Rep. of Germany | 427/252 |
| WO85/04428 | 10/1985 | PCT Int'l Appl. | 427/454 |

OTHER PUBLICATIONS

Goward, G. W. et al., "Formation and Degradation Mechanisms of Aluminide Coatings on Nickel-Base Superalloys", Transactions of the ASM, vol. 60 (1967), pp. 228-240.

*Primary Examiner*—Terry J. Owens
*Attorney, Agent, or Firm*—Jerome C. Squillaro; Carmen Santa Maria

[57] ABSTRACT

An article is coated with a thermal barrier coating system to increase its thermal cyclic spallation life. A single layer bond coating is applied to the surface of the article to a surface roughness in the range of 200 to 600 microinches RA by low pressure plasma spraying of coarse MCrAlY alloy particles into the surface. A metal selected from aluminum and its alloys is applied to the bond coating by aluminiding and is diffused into the bond coating to provide an aluminum-rich bond coating metal outer surface, while substantially retaining the surface roughness of about 2300 to 600 microinches RA. A metal oxide thermal barrier coating layer is then applied onto the aluminum-rich bond coating outer surface.

4 Claims, No Drawings

METHOD FOR INCREASING THE CYCLIC SPALLATION LIFE OF A THERMAL BARRIER COATING

This invention relates to thermal barrier coatings applied to metal substrates for high temperature exposure protection, and, more particularly, to thermal barrier coating systems in which a bond coating is disposed between the substrate and the thermal barrier coating.

BACKGROUND OF THE INVENTION

In the gas turbine engine art, particularly those developed for use in aircraft, high temperature operating components are exposed to strenuous oxidizing conditions during operation. Typical of such components are the blades, vanes and associated parts disposed in the turbine section of such engines. In order to extend the operating life of such articles, designers have specified coatings for application to article surfaces for oxidation as well as sulfidation protection.

One such coating has been reported as a thermal barrier coating system in a variety of forms. Generally, the thermal barrier coating is a ceramic type coating, examples of which include zirconia generally stabilized with yttria, magnesia or calcia. A preferred form of such a system includes a bond coating disposed between the substrate and the ceramic thermal barrier coating. Reported have been bond coatings of the M Cr Al type of alloy in which M is a metal selected from Fe, Ni, Co and their mixtures and alloys. Other elements including Y, rare earths, Pt, Rh, Pd, Hf, etc., and their combinations have been included in such an M Cr Al alloy to enhance selected properties. Typical U.S. patents describing such a system or elements thereof include U.S. Pat. No. 4,055,705 -Stecura, et al. (patented Oct. 25, 1977); U.S. Pat. No. 4,269,903 -Clingman, et al. (patented May 26, 1981); U.S. Pat. No. 4,321,310 -Ulion, et al. (patented Mar. 23, 1982); U.S. Pat. No. 4,321,311 -Strangman (patented Mar. 23, 1981); U.S. Pat. No. 4,335,190 - Bill, et al. (patented Jun. 15, 1982) and U.S. Pat. No. 4,880,614 -Strangman (patented Nov. 14, 1989). The disclosure of each of these references is hereby incorporated herein by reference. For example, there is described in the disclosure of U.S. Pat. No. 4,880,614 - Strangman a chemical vapor deposited (CVD) interfacial layer of a high purity, dense ceramic oxide of alpha alumina deposited over an M Cr Al Y bond coat, and between the metal bond coat and the ceramic thermal barrier coating. Optionally, a diffusion aluminide can be included at the surface of the substrate, beneath the bond coat.

Methods for applying known systems, such as are described in the above incorporated patents, require vacuum or low pressure application systems which are difficult to control, require expensive, complex equipment and can have a lower production efficiency. Accordingly, the resultant coatings systems and articles are expensive to manufacture.

SUMMARY OF THE INVENTION

The present invention, in one form, describes an improved method for providing a thermal barrier coating system which includes a bond coating of good mechanical properties and improved environmental resistance as a result of diffusion of Al into the bond coating outer portion. In addition, the bond coating is applied with an outer portion of a surface roughness in the range of about 200–600 microinches Roughness Average (RA), and the diffusion of Al into such portion substantially retains such surface roughness as an anchor for a subsequently applied thermal barrier coating. The resulting article and coating system is characterized by an interface between the thermal barrier coating and bond coating outer portion of such roughness.

In one form of the present invention, the Al is applied by an aluminiding process described widely in the art, for example in a pack, vapor atmosphere, local powder application, etc. Such a process diffuses Al or its alloys into an exposed surface slowly to better seal any porosity and yet retain the underlying surface finish, in this case about 200–600 microinches RA.

It has been found that, in a preferred form of the present invention, the bond coating can be applied at substantially ambient pressure rather than under reduced pressure or vacuum required by known methods. The term "substantially ambient pressure" as used herein is intended to mean application, such as flame or plasma spraying, in air or under a non-oxidizing or inert gas to cover or shroud the spray, as differentiated from reduced pressure applications used generally in known methods for bond coating application.

The combination of the present invention provides a thermal barrier coated article which includes a system that has good mechanical properties, good high temperature environmental resistance and resists spalling of the thermal barrier coating from underlying portions of the coating system or from the article substrate. As a result, the article resulting from the system and use of the method of the present invention can be used at higher operating temperatures because of such combination of properties and characteristics.

DESCRIPTION OF THE PREFERRED EMBODIMENTS

Known thermal barrier coating systems applied to such articles as gas turbine engine airfoils for use in the turbine section include applying to the airfoil substrate a metal bond coat by a low pressure plasma process (LPPS). This is followed by the application to the bond coat of a ceramic zirconia, most frequently stabilized with yttria, using an air plasma spray. The bond coat application by a LPPS process uses a partial vacuum chamber system requiring substantial capital investment. Also, the LPPS process uses a partial vacuum chamber system requiring substantial capital investment. Also, the LPPS process steps consume substantial amounts of time thereby reducing productivity: for each chamber load, a vacuum must be established and refilled with partial pressure inert gas, spray coating conducted, followed by cool down in vacuum and unloading.

Although a variety of bond coatings of the above described M Cr Al type have been reported for use with thermal barrier coatings, it has been recognized that those types of coatings with less than about 12 wt % Al can have better high temperature (for example in the 2000°–2100° F. range) creep and stress rupture resistance than those with higher Al content. However, such lower Al content results in lower oxidation resistance. The present invention in one form combines use of a high strength bond coat with an aluminum diffusion into the bond coat outer portion to provide a bond coat with a combination of good mechanical properties as well as good environmental resistance. In another form, in combination with a bond coat, is its application to provide a surface roughness in the range of about 200–600 microinches RA as an improved anchor for a subsequently applied thermal barrier coating, irrespective of the type of bond coat composition. In a preferred combination of the present invention, a bond coating of the MCrAlY type alloy with less than about 12 wt % Al is applied, using alloy particles of a size selected to provide a surface roughness in the range of about 200–600 microinches RA, in a substantially ambient pressure spray process. Then the outer portion of the bond coating is aluminided to increase the Al content for improved environmental resistance while retaining the surface roughness as an anchor for the covering thermal barrier coating and sealing porosity in the outer surface of the bond coating.

During evaluation of the present invention, it has been recognized that a bond coating outer portion surface should have a surface roughness, as applied, in the range of about 200–600 microinches RA. It has been found that a surface roughness of less than about 200 microinches RA provides insufficient roughness to anchor the subsequently applied ceramic thermal barrier coating. A surface roughness of greater than about 600 microinches RA results in too high a surface porosity to be sealed by an Al diffusion and a path for thermal fatigue failure as well as oxidation penetration. Therefore, according to the method form of the present invention, particles of the bond coating alloy are selected to be of a size which, after spray application, will provide a bond coating outer portion with a surface roughness in the range of 200–600 microinches RA.

As was mentioned above, a preferred method for increasing the Al content of the outer portion of the bond coat is by aluminiding. Such processes and associated materials are described in the art, for example in U.S. Pat. No. 3,540,878Levine et al. (patented Nov. 17, 1970); U.S. Pat. No. 3,598,638Levine (patented Aug. 10, 1971); U.S. Pat. No. 3,617,360- Levine (patented Nov. 2, 1971); and U.S. Pat. No. 4,004,047- Gresile (patented Jan. 18, 1977), among others. The above patent U.S. Pat. No. 3,540,878- Levine et al. describes a particulate pack mixture and process for aluminiding an article embedded in the pack generally referred to as CODEP coating. The above U.S. Pat. No. 3,598,638 describes an aluminiding process in which the article is suspended above such a pack and is exposed to vapors released from the particulate pack. The disclosure of each of the above listed patents is hereby incorporated herein by reference. However, it should be understood that other methods of application, including for example spray methods, chemical vapor deposition, in-pack methods, laser methods and other methods, may be used for Al application.

The following Table I summarizes furnace cycle test data developed during evaluation of the present invention. In preparation of the specimens from which these data were obtained, the air plasma spray (APS) application was conducted with air at a pressure of about 35 psi with a nitrogen gas primary cover at about 65 psi. The low pressure plasma spray application (LPPS) was conducted in a vacuum chamber under a partial pressure of 50 Torr of nitrogen gas. In each example, the thermal barrier coating (TBC) was 0.01–0.02" in thickness and the total bond coating thickness was in the range of 0.003–0.006 inch. Each test cycle conducted was 45 minutes at 2000° F. in air and then cool down in air to room temperature. After holding at room temperature for 15 minutes, the cycle was repeated. In the specimens used for Table I data, both bond coatings were of the NiCrAl - type alloy. Alloy BC52 was, in nominal weight percent, 18 Cr, 6.5 Al, 10 Co, 6 Ta, 2 Re, 0.5 Hf, 0.3 Y, 1 Si, 0.015 Zr, 0.06 C, 0.015 B, with the balance Ni and incidental impurities. Alloy NiCrAlY was, in nominal weight percent, 22 Cr, 10 Al, 1 Y, with the balance Ni and incidental impurities. These alloys were applied from powder in the size ranged −140+230 ASTM standard mesh size to provide the desired surface roughness. The thermal barrier coating (TBC) applied over the bond coatings was $ZrO_2$ stabilized with 8 wt % $Y_2O_3$ and, in each example, was applied by air plasma spray (APS). The substrate alloy identified as R80 was commercially available Rene'80 alloy having a nominal composition, by weight % of 0.17 C, 14 Cr, 5 Ti, 0.015 B, 3 Al, 4 W, 4 Mo, 9.5 Co, 0.05 Zr with the balance Ni and incidental impurities. The alloy identified as N5 had a nominal composition, in weight %, of 0.05 C, 7 Cr, 0.004 B, 6.2 Al, 5.2 W, 1.5 Mo, 6.5 Ta, 7.5 Co, 0.15 Hf, 0.01 Y, 3 Re with the balance of Ni and incidental impurities.

TABLE I

| | | FURNACE CYCLE TEST DATA | | | | | |
|---|---|---|---|---|---|---|---|
| | | Bond Coating | | | | Average Life | |
| | | As Applied Surface Roughness | How | | Substrate | (Cycles to % Spallation) | |
| Example | Composition | (Microinches (RA)) | Applied | Aluminided(a) | Alloy | To 10% | To 20% |
| 1 | BC52 | 481–544 | APS | Yes | R80 | 750 | 760 |
| 2 | BC52 | 481–544 | APS | Yes | N5 | 720 | 790 |
| 3 | BC52 | 481–544 | APS | No | R80(b) | 8 | 80 |
| 4 | BC52 | 481–544 | APS | No | N5(b) | 200 | 210 |
| 5 | NiCrAlY | 300–350(c) | APS | No | R80 | 100 | 110 |
| 6 | NiCrAlY | 300–350(c) | APS | No | N5 | 320 | 350 |
| 7 | BC52 | 434–486 | LPPS | Yes | R80 | 1000(to 6%) | — |
| 8 | BC52 | 434–486 | LPPS | Yes | N5 | 1000(to 6%) | — |
| 9 | BC52 | 400–500(c) | LPPS | No | R80(b) | 350 | 380 |
| 10 | BC52 | 400–500(c) | LPPS | No | N5(b) | 770 | 780 |

(a)CODEP pack aluminide to a thickness of 0.0015–0.004"
(b)CODEP pack aluminide to a substrate prior to bond coat
(c)estimate The data of Table I clearly shows the significantly extended cycle life of Examples 1 and 2 prepared in accordance with the present invention for an APS applied bond coating, including an aluminide treatment of the bond coating outer portion over a relatively low Al content MCrAlY-type bond alloy. The much lower life of the NiCrAlY bond coat, with an Al content in the range of 9–11 wt % (nominal 10 wt %), in a system without bond coating aluminiding, is shown. Although not wishing to held to the theory, it is believed that the N5 substrate alloy, having a somewhat higher Al content than R80 alloy, has a somewhat higher life because Al is available for diffusion from the N5 substrate into the bond coat.

The data of examples 1 through 6 show that a bond coat applied at substantially ambient pressure, in this case air plasma spray (APS), can, with an aluminide applied over the bond coat, have excellent resistance to spallation under thermal cyclic conditions. It should be noted in connection with examples 3 and 4, application of an aluminide to the substrate prior to bond coating (as optionally included in the above incorporated U.S. Pat. No. 4,880,614 - Strangman, et al) rather than to the outer portion of the applied bond coating (as in this invention), does not improve the average thermal cycle resistance to spallation. Examples 7 and 8 data are included to show the improvement to a LPPS applied bond coating by aluminiding the bond coat outer portion compared with examples 9 and 10 for an LPPS coating without bond coating aluminiding.

From the data of Table I, it is clear that a significant thermal cyclic life improvement in a thermal barrier coating system is realized as a result of aluminiding the bond coating outer portion which has a surface roughness in the range of about 200–600 microinches RA. Although LPPS application of a bond coating can provide good results, it is expensive to apply. The present invention provides a less expensive, simpler alternative, not recognized previously in the art, through application of such an aluminide to the bond coating outer portion.

The data of the following Table II is presented to show that the as-applied surface roughness of the bond coat is substantially retained after aluminiding. The bond coating was the above described BC52 Alloy applied by air plasma spray (APS).

TABLE II

| Surface Roughness Before and After Aluminiding (in Microinches (RA)) | | |
|---|---|---|
| Example | Before Aluminiding | After Aluminiding |
| C1 | 514 | 483 |
| C2 | 478 | 486 |
| D1 | 510 | 557 |
| D2 | 473 | 496 |

The present invention has been described in connection with typical examples and embodiments presented above. However, it should be understood that such examples are not intended to be limiting on the scope of this invention. Other embodiments will be apparent to those skilled in the art, within the scope of the appended claims.

What is claimed is:

1. A method for coating an article substrate with a thermal barrier coating system including a single layer bond coating having an inner portion disposed toward the substrate and an outer portion away from the substrate and facing a thermal barrier coating, comprising the steps of:

applying to the substrate the single layer bond coating to a surface roughness on the outer portion in the range of 200–600 microinches RA;

diffusing into the single layer bond coating outer potion a metal selected from the group consisting of Al and its alloys to provide an Al-rich bond coating metal outer surface, while substantially retaining the surface roughness of about 200–600 microinches; and depositing the thermal barrier coating layer on the Al-rich bond coating outer surface.

2. A method for coating an article substrate, wherein the article substrate is based on an element selected from the group consisting of Ni, Co and their mixtures, with a thermal barrier coating system including a single layer bond coating having an inner portion disposed toward the substrate and an outer portion away from the substrate and facing a thermal barrier coating, comprising the steps of:

applying to the substrate the single layer bond coating comprising an MCrAlY alloy in which M is selected from the group consisting of Fe, Ni, Co and their mixtures and alloys, bonded at the inner portion to the substrate, the single layer bond coating having the outer portion facing away from the substrate;

diffusing into the single layer bond coating outer portion a metal selected from the group consisting of Al and its alloys to provide an Al-rich bond coating metal outer surface; and depositing the thermal barrier coating on the Al-rich bond coating outer surface.

3. The method of claim 2 in which the single layer bond coating is applied at substantially ambient pressure using coarse MCrAlY alloy particles of a size selected to provide the bond coating outer portion with a surface roughness in the range of about 200–600 microinches.

4. The method of claim 3 in which the metal diffused into the bond coating outer portion is applied by aluminiding.

* * * * *